United States Patent [19]

Ryles

[11] Patent Number: 4,788,228

[45] Date of Patent: Nov. 29, 1988

[54] HIGH TEMPERATURE PROFILE MODIFICATION AGENTS AND METHODS FOR USING SAME

[75] Inventor: Roderick G. Ryles, Milford, Conn.

[73] Assignee: American Cyanamid Company, Stamford, Conn.

[21] Appl. No.: 946,265

[22] Filed: Dec. 24, 1986

[51] Int. Cl.$^4$ .................. E21B 33/138; E21B 43/20; C08F 8/42

[52] U.S. Cl. ................. 523/130; 252/8.554; 166/274; 166/295; 524/547

[58] Field of Search .................. 252/8.551, 8.554; 523/130

[56] References Cited

U.S. PATENT DOCUMENTS

| | | | |
|---|---|---|---|
| 3,502,149 | 3/1970 | Pence . | |
| 3,639,184 | 2/1972 | Grant | 149/44 |
| 3,679,000 | 7/1972 | Kaufman . | |
| 3,727,689 | 4/1973 | Clampitt . | |
| 3,749,172 | 7/1973 | Hessert et al. | 166/274 |
| 3,762,476 | 10/1973 | Gall | 166/294 |
| 3,785,437 | 1/1974 | Clampitt et al. | 166/281 |
| 3,981,363 | 9/1976 | Gall | 166/294 X |
| 4,015,991 | 4/1977 | Persinski et al. | 523/130 X |
| 4,137,182 | 1/1979 | Golinkin . | |
| 4,172,041 | 10/1979 | Clampitt et al. . | |
| 4,563,290 | 1/1986 | Okada et al. . | |
| 4,655,943 | 4/1987 | Elmquist et al. . | |
| 4,669,920 | 6/1987 | Dymond . | |

Primary Examiner—Herbert B. Guynn
Assistant Examiner—G. Geist

Attorney, Agent, or Firm—Frank M. Van Riet

[57] ABSTRACT

A new and improved composition and method for profile modification of subterranean formations characterized by high reservoir temperatures and/or harsh brine conditions are disclosed. The new and improved profile modification agents comprise a gelable composition comprising:

(a) water;

(b) a water-thickening and crosslinkable amount of a water-dispersible copolymer comprising from about 1 to about 99 mol % of units derived from an $N,N^1$-dialkylacrylamide monomer copolymerized with from about 1 to about 99 mol % of units derived from acrylic acid or a salt thereof; and (c) an amount of a polyvalent metal sufficient to crosslink the copolymer to form a stable gel. The profile modification agents are effective to alter the permeability of preselected portions of an underground formation by forming strong gels which are stable in harsh brine at temperatures of up to about 120° C. The composition and method are particularly adapted for use in enhanced oil recovery operations.

Additionally, component (b) can be a water-dispersible terpolymer comprising from about 5 to about 75 mol percent of units derived from an $N,N^1$-dialkylacrylamide, from about 5 to about 35 mol percent of units derived from acrylic acid or salts thereof and from about 10 to about 90 mol percent of units derived from 2-acrylamido-2-methylpropanesulfonic acid or salts thereof.

14 Claims, No Drawings

HIGH TEMPERATURE PROFILE MODIFICATION AGENTS AND METHODS FOR USING SAME

BACKGROUND OF THE INVENTION

The present invention relates to profile modification agents for altering the permeability of preselected portions of a subterranean formation. In preferred embodiments, the present invention relates to a new and improved composition and method for profile modification of a subterranean hydrocarbon-containing formation to reduce water:oil ratios and improved petroleum recovery during enhanced oil recovery operations. More particularly, it relates to new and improved aqueous gelable compositions exhibiting high temperature gel stability at temperatures up to about 150° C. and in harsh brines and methods for using same.

The enhanced secondary recovery of oil from oil-bearing or containing subterranean formations by fluid drive processes, wherein a fluid is injected into the formation by one or more injection wells to drive the oil through the formation to one or more production wells is a known process, commonly referred to as enhanced oil recovery. Fluids used in such processes include liquids such as water and various hydrocarbons, and gases such as hydrocarbon gases, carbon dioxide, steam, etc. Many oil reservoirs comprise layers or zones of porous rock which can vary in permeability from zone to zone. In all fluid drive processes, a recognized problem is the predilection of the drive fluid to channel along or through the more permeable zones of the formation. This is commonly referred to as channeling. Another problem is viscous fingering which occurs, for example, by the over-ride of a viscous fluid by a less viscous fluid. The more conductive zones after the oil has been largely displaced therefrom function as "thief zones" which permit the drive fluid to channel directly from injection to production wells. In many instances, such channeling or fingering results in leaving substantial quantities of oil in the less permeable zones of the formation which are bypassed. Such channeling or fingering can occur when the mobility i.e. the quotient of the reservoir's permeability to the drive fluid divided by the viscosity of the drive fluid becomes large relative to the mobility of the reservoir oil.

One of the significant problems, therefore, attendant to the production of oil and gas from subterranean hydrocarbon containing formations, is the concomitant production of water. Such produced water can be reservoir water occasioned by coning or a similar phenomena of the aquifier, or it can be injection water from secondary or tertiary recovery treatments being applied to the formation. Whatever the source, there is an upper limit beyond which water production can no longer be tolerated and its further entry into the producing well bore must at least be reduced if further production of hydrocarbon resources at that location is to be continued.

Regardless of whether the undesired water is a natural drive fluid or an artificial drive fluid such as from secondary or tertiary recovery projects, the problem is primarily occasioned by the predilection of the drive fluid to preferentially seek the higher permeability zones and to more or less bypass the lower permeability zones. The mobility of a fluid in a permeable geological formation is the effective permeability of the formation to that fluid divided by the viscosity of the fluid. In the past, a conventional method for reducing the mobility of drive fluids through permeable formations has been to increase the drive fluids viscosity. Such an increase in viscosity is generally accomplished by using viscous solutions of high molecular weight polymers such as polyacrylamides, cellulose ethers, polysaccharides and the like. Such polymeric solutions have been found effective for reducing the water:oil ratio in the total producing well effluent and for increasing the daily production of hydrocarbonaceous fluids.

In actual field practice, however, such mobility altering polymers elute out of producing wells quickly and the water:oil ratios rapidly rise back to an undesirable level necessitating retreatment of the producing interval with the viscous polymer solutions. These viscosity increasing polymers are relatively expensive materials and a one time treatment would be particularly desirable.

More recently, reduction in the permeability of the pre-selected portions of various subterranean oil bearing formations has been accomplished with gelable solutions of polymeric materials. The formation of gels by the cross-linking of polymers is well known in the art for this purpose. A great deal of literature has been generated concerning the formation of gels in situ in underground formations for the purpose of treating the formations to better produce oil and gas from bore holes drilled into the formations and to decrease undesired water output. It is well recognized that polymer gels and processes incorporating same facilitate the plugging of underground formations in desired areas e.g. by modifying the fluid flow profile, and in particular by decreasing the relative permeability of the most permeable portions of the formations.

Prior art gelling compositions for use in profile modification applications generally comprise water, polymers capable of being cross-linked by polyvalent metal cations and polyvalent metal ion crosslinker. Prior art crosslinkable polymers have included polyacrylamides, carboxymethylcelluloses and polysaccharides, generally of high molecular weight in excess of one million. A commonly used system for generating polyvalent metal ions has been to provide them in the form of chelated metal ion complexes or as part of a redox system. The redox system will generally comprise redox couples wherein the oxidizing agent is selected from water soluble compounds of polyvalent metals wherein the metal is present in a valence state which is capable of being reduced to a lower polyvalent state as exemplified by potassium permanganate, sodium permanganate, ammonium chromate, ammonium dichromate, the alkali metal chromates, the alkali metal dichromates and chromium trioxide. Sodium dichromate and potassium dichromate because of low cost and ready availability are the most widely used of the oxidizing agents. The reducing agents in the redox couples have included sulfur containing compounds such as sodium or potassium sulfide, sodium or potassium hydrosulfide, sodium or potassium metabisulfite, sodium or potassium bisulfite, hydrogen sulfide, sodium or potassium thiosulfate, thioacetamide and others, as well as non-sulfur containing compounds, such as hydroquinone, perahydrazinobenzoic acid, hydrazine phosphite, hydrazine dichloride and others. Illustrative prior art profile modification compositions and methods are disclosed in U.S. Pat. Nos. 2,718,497; 3,502,149; 3,727,689; 3,749,172; 3,762,476; 3,785,437; 3,795,276; 3,952,806; 3,964,923;

3,981,363; 4,018,286; 4,039,029; 4,040,484; 4,043,921; 4,055,502; 4,110,230; 4,120,361; and 4,498,539 to list but a few.

The crosslinkable polymers used in the past have comprised mainly high molecular weight partially hydrolyzed polyacrylamide compounds. A serious shortcoming of the high molecular weight polyacrylamides is that the effective life of the gel as a profile modifier is seriously decreased by the natural temperature of oil-bearing formations having temperature above, for example, 60° C. and the hydrolysis caused thereby. This temperature effect is further complicated by the significant divalent ion concentrations found in most reservoir fluids, which can cause precipitation of the modifier. Lower molecular weight polyacrylamides which are partially hydrolyzed to about 10 mol percent carboxylate groups have also been used. The higher molecular weight polyacrylamides may be used at lower polymer concentration and hence have been considered more economical. However, the thermal stability of the higher molecular weight polyacrylamide materials is poorer than for the lower molecular weight polyacrylamides and the lower molecular weight materials have exhibited the best stability properties of the materials currently in use. Gelable compositions comprising optimum concentrations of low molecular weight polyacrylamide and cross-linking agent perform satisfactorily up to temperatures of about 90° C. However, at higher reservoir temperatures such as those occurring naturally in a number of locations, such as the North Sea, for example, temperatures at or above 120° C., frequently as high as about 150° C., or often higher, even up to 200° C. are commonly encountered. At these higher temperatures, even the low molecular weight polyacrylamide gelable composition loses all of its strength within a matter of days. Moreover, as has been mentioned, the polyacrylamides and partially hydrolyzed polyacrylamides are susceptible to degradation and precipitation in harsh environment reservoirs containing divalent ions such as $Ca^{2+}$, $Mg^{2+}$ and $Ba^{2+}$. Effective profile modification requires the gels to retain their strength and water diverting characteristics for a time sufficient to accomplish the flood at higher temperatures up to at least about 120° C., preferably up to about 150° C., and especially preferable to about 200° C. in harsh brine environments. At the higher temperatures shorter time periods are required.

N-sulfohydrocarbon-substituted acrylamide monomers and polymers comprising same are known. See, for example, U.S. Pat. No. 3,547,899, which discloses a homopolymer of poly(2-acrylamido-2-methylpropanesulfonic acid) (AMPS). In U.S. Pat. No. 3,679,000, it is disclosed that polymers and copolymers of N-sulfohydrocarbon-substituted acrylamide monomers are useful as mobility control agents, i.e., as viscosifiers in polymer-flooding or fluid drive processes.

In commonly assigned U.S. Pat. No. 4,573,533 a mobility control reagent comprising an aqueous composition of a polymer consisting of acrylamide units and units of 2-acrylamido-2-methylpropanesulfonic acid or its salts, is disclosed which is resistant to viscosity degradation in the presence of divalent salt containing brines up to or at temperatures of about 90° C. These acrylamide copolymers, however, are generally not crosslinkable to form gels, and therefore are not suitable for extended profile modification applications.

In commonly assigned copending application, Ser. No. 729,512 now U.S. Pat. No. 4,746,687, there is disclosed copolymers of (1) 2-acrylamido-2-methylpropanesulfonic acid and salts thereof and (2) acrylic acid and salts thereof as gellable compositions in conjunction with water and polyvalent metal cross-linkers. While effective, the polymers are less than all encompassing and, or such, the search continues for polymer systems useful as profile modifiers.

Accordingly, it is an object of the present invention to provide a new and improved composition and method for profile modification operations which is effective at elevated temperatures of up to at least about 120° C. preferably up to about 150° C. and especially preferably up to about 200° C., even in harsh environment reservoirs.

SUMMARY OF THE INVENTION

Unexpectedly, in view of the foregoing, it has now been discovered that effective profile modification in high temperature reservoirs having formation temperatures of up to about 120° C., preferably up to 150° C., and especially preferably up to about 200° C. may be achieved using a gelable composition comprising a polymer which contains dialkylacrylamide units.

More particularly, the present invention provides a new and improved gelable composition, useful for altering the fluid flow profile of a subterranean formation, which exhibits high temperature stability in the gelled state at temperatures up to about 200° C., comprising:

(a) water;

(b) a water thickening amount of a water dispersible copolymer comprising:

(i) from about 1 to about 99 mol percent of units of the formula:

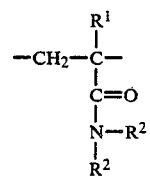

wherein $R^1$ is hydrogen or a lower alkyl radical and $R^2$ is a lower alkyl radical; and (ii) from about 1 to about 99 mol percent of units derived from acrylic acid or salts thereof; and (c) an amount of a polyvalent metal capable of cross-linking said copolymer to form a high temperature stable gel.

The present invention also includes a second gelable composition, useful for altering the fluid flow profile of a subterranean formation, which exhibits high temperature stability in the gel state at temperatures up to about 200° C., comprising:

(a) water;

(b) a water thickening amount of a water-dispersible terpolymers comprising (i) from about 5 to about 75 mol percent of units of the formula:

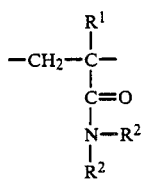

wherein $R^1$ and $R^2$ are as described above,
(ii) from about 5 to about 35 mole percent of acrylic acid units or salts thereof and
(iii) from about 10 to about 90 mole percent of 2-acrylamido-2-methylpropanesulfonic acid units or salts thereof and
(c) an amount of a polyvalent metal capable of crosslinking said terpolymer to form a high temperature stable gel.

The concentration of the polymers in the gelable compositions may vary and the amount of polymer required to form a satisfactory gel will generally depend upon the molecular weight thereof, the number of crosslinkable sights per molecule, crosslinker concentration and the desired gel characteristics for a particular end use. Generally, and without limitation, in the gelable compositions, the polymer concentration should be at least 3 times the overlap concentration for the polymer, preferably at least 3–5 times the overlap concentration. Generally, insufficient overlap provides a poorer gel. Expressed differently, the concentration of the polymer employed should be within the range referred to as the "concentrated region of polymers in solution." Generally good results are obtained wherein the polymer concentration of the gelable composition is from about 0.5% to about 5.0% and preferably is from about 2.0 to about 4.0% based on the total weight of gelable composition.

As mentioned above, the concentration of the polymer required to form satisfactory gels varies inversely with molecular weight of the copolymer. Generally, the molecular weight of the polymer should be from about 100,000 to about 15 million, and preferably from about 500,000 to about 5.0 million expressed in terms of $M_w$.

The mol percent ratio of (i), $N,N^1$-dialkylacrylamide units to said (ii) units in the polymers may vary depending on the final gel properties required or desired. In this connection, the gel strength depends upon the quantity of chelatable i.e., carboxyl groups present contributed by the (ii) units, the strength of the metal chelate bond, molecular weight of the polymer, and salinity of the solution to be more fully described hereinafter. Polymer stability depends on the quantity of N-sulfohydrocarbon-substituted acrylamide units present.

In preferred embodiments, the copolymer and terpolymer are comprised of (i) $N,N^1$-dimethylacrylamide units and (ii) sodium acrylate units. In addition, in preferred embodiments, the copolymers will comprise from about 5–95 mol percent of (i) units and 5 to 95 mol percent of (ii) units, and copolymers comprising from about 30 to about 70 mol percent of (i) units and 30 to 70 mol percent of (ii) units are especially preferred for long term gel stability at temperatures up to about 150° and preferably up to about 200° C.

Preferred concentrations of monomers in the terpolymers are from about 10–50 mol percent of the (i) units, from about 10–30 mol percent of the (ii) units and from about 20–80 mol percent of the (iii) units. Even more preferred concentrations comprise from about 30–50 mol percent of the (i) units, from about 15–25 mol percent of the (ii) units and from about 40–60 mol percent of the (iii) units.

In all concentrations of the components of the copolymers and terpolymers expressed herein, the total concentration is, of course, 100 mol percent.

The polyvalent metal ions for use as component (c) may comprise any polyvalent metal ions capable of crosslinking the copolymer component (b) to form a high temperature stable gel. Illustrative examples of some of these polyvalent metal ions include $Fe^{2+}$, $Fe^{3+}$, $Al^{3+}$, $Ti^{4+}$, $Zn^{2+}$, $Sn^{4+}$, $Cr^{3+}$, $Ce^{4+}$, $Zr^{4+}$, $Ba^{2+}$, $Ca^{2+}$, $Mg^{2+}$ and $Mn^{4+}$ to name but a few. Generally, the polyvalent metal ions may be added as is, but in many end use applications, the polyvalent metal ions may be added in the form of a redox couple, or in the form of a chelated complex, each being capable of generating the polyvalent metal ion crosslinking agents in situ, to provide flexibility with respect to onset of gelation times and placement of the gel at desired locations within the formation. Rate of reaction in each case will be determined by the difference in the redox potential or by the strength of the complex, respectively. The crosslinking agents and crosslinking methods will be more particularly described hereinafter.

The present invention provides alternate embodiments of the gelable compositions. For example, instead of aqueous gelable compositions, the compositions of this invention may be provided in the form of solutions, inverted emulsions or as dry products. Moreover, the compositions may be provided in the form of wet or dry two package gelation systems.

In an alternate aspect of the present invention, there is provided a new and improved method for altering the fluid flow profile of a petroleum-bearing, underground formation penetrated by at least one wellbore to provide improved production of oil from the formation, said method comprising:
(a) injecting into said formation the gelable compositions of the present invention defined above; and
(b) permitting gelation of the polymer to proceed until substantially complete. In accordance with an alternate method of the present invention, the gelable polymer and the crosslinking polyvalent metal ion may be added separately in alternating slugs, to mix the polymer and crosslinking agent within the formation to generate the high temperature stable gels in situ. Using either embodiment of the present method, the gelable compositions will preferentially travel to the more permeable zones within the formation and gel, rendering these zones less permeable to fluid flow. Modifying the fluid flow profile of the formation in this manner provides a substantial decrease in the volume ratio of water:oil produced from the formation at the production wells, thereby improving the overall oil recovery and economics of the operation. Moreover, the compositions and methods of the present invention permit effective profile modification in high temperature harsh brine reservoirs heretofore unattainable with prior art compositions and methods.

The compositions and methods of the present invention are also useful in sealing underground formations to be used as waste containment sites, whereby after treatment, an underground formation may be rendered impermeable to the flow of waste materials away from the site and impermeable to the flow of water into or through the site.

Other objects and advantages provided by the present invention will become apparent from the following detailed description of the invention and illustrative working Examples.

DETAILED DESCRIPTION OF THE INVENTION

In accordance with the present invention effective profile modification of high temperature and harsh brine environment reservoirs is provided with a gelable water-dispersible copolymer comprising:

(i) from about 1 to 99 mol percent of the N,N$^1$-dialkylacrylamide units, and (ii) from about 1 to about 99 mol percent of the acrylic acid units or salts thereof.

More particularly, the (i) units of the copolymer are derived from an N,N$^1$-dialkylacrylamide monomer having the formula set forth above. These monomeric units are represented by the above formula in which $R^1$ is hydrogen or a lower ($C_1$–$C_4$) alkyl radical and $R^2$ is a lower ($C_1$–$C_4$) alkyl radical. Preferred units are those derived from N,N$^1$-dimethylacrylamide.

The copolymers also comprise from about 1 to about 99 mol percent of units derived from acrylic acid or salts thereof. Illustrative salts are the alkali metal or ammonium salts, to name but a few.

Those units represented by components (i) and (ii) of the terpolymers is useful herein are the same as those described above for the copolymers. The unit represented by component (iii) is that derived from 2-acrylamido-2-methylpropylsulfonic acid and its salts. Alkali metal or ammonium salts are exemplary with sodium or potassium salts being preferred.

The crosslinkable, water dispersible polymers for use in the compositions and methods of the present invention may be prepared in bulk, solution, suspension or emulsion. Since the polymers should be at least water-dispersible, if not water-soluble, it is convenient to prepare them in aqueous solution. Another method is to prepare an aqueous solution of the monomers and to suspend this solution in a water-immiscible solvent such as an aliphatic or aromatic hydrocarbon or halogenated hydrocarbon. Generally, the sulfonic acid monomer and the acrylic acid monomer are converted to their alkali metal or ammonium salts prior to polymerization by means of a suitable alkaline reagent. When the polymerization is effected in suspension, ordinary suspension agents known to those skilled in the art are used.

The polymerization may be promoted by typical initiators used in aqueous systems, especially peroxides, persulfates and the like. It has been found that the alkali metal salts, especially the sodium salts, of 2-acrylamido-2-methylpropane sulfonic acid may be polymerized in the absence of an initiator. Moreover, polymerization may be initiated by the various Azo-type initiators or actinic radiation, e.g. ultraviolet or electron beam, sources and methods may be used.

It is sometimes advantageous to carry out the polymerization in the presence of a small amount of chain transfer agents, to provide polymer products having more uniform molecular weights, i.e. a narrower molecular weight distribution range. Suitable chain transfer agents are well known and will suggest themselves to those skilled in this art.

As has been mentioned above, the gelable compositions of the present invention are for use as profile modification agents and in this application the polymers should be prepared so as to provide polymers having a molecular weight, $M_w$, of from about 100,000 to about 15 million, preferably from about 500,000 to about 5 million. The polymer should be at least 3 and preferably at least 3–5 times the overlap concentration of the polymers. Polymers concentrations for polymers of molecular weight within the range set forth above, will generally be from about 0.5% to about 5.0%, and preferably from about 2.0% to 4.0% by weight of the gelable composition.

As has been mentioned above, the acrylic acid or salt containing (ii) units are responsible for the formation of the crosslinked, gel network, and the N,N$^1$-dialkylacrylamide or (i) units are responsible for high temperature and harsh environment stability of the network. In the terpolymers, the 2-acrylamino-2-methylpropanesulfonic acid and salt units also contribute to the high temperature and harsh environment stability.

The gelable composition of the present invention also comprise, as component (c), an amount of a polyvalent metal capable of crosslinking the polymers to form a high temperature stable gel. The polyvalent metals may be added as an aqueous solution of their respective water-soluble salts, or as chelates, however, they are preferably added in the form of a redox couple.

More particularly, the crosslinking agents, component (c), are preferably added in the form of a redox couple wherein the redox couple comprises:

(i) at least one oxidizing agent comprising a water soluble compound of a polyvalent metal wherein the metal is present in its highest valence state and is capable of being reduced to a lower polyvalent valence state and being in a form normally unavailable for reaction until contacted with a reducing agent; and (ii) a reducing agent effective to reduce the higher valence metal in oxidizing agent (i) to a lower polyvalent valence state.

The oxidizing agents for use herein are water-soluble compounds of polyvalent metals wherein the metal is present in a valence state which is capable of being reduced to a lower valence state. Examples of such compounds include potassium permanganate, sodium permanganate, ammonium chromate, ammonium dichromate, the alkali metal chromates, the alkali metal dichromates, and chromium trioxide. Sodium dichromate and potassium dichromate, are the presently preferred metal-containing compounds for use in the practice of the invention. The hexavalent chromium in these chromium compounds is reduced in situ to trivalent chromium by suitable reducing agents as discussed hereinafter. In the permanganate compounds the manganese is reduced from +7 valence to +4 valence as in $MnO_2$.

The amount of metal-containing compounds used in the practice of the invention will be an optimum amount, i.e., a small but finite amount which is more than incidental impurities, but which is effective or sufficient to cause subsequent gelation when the metal in the polyvalent metal compound is reduced to a lower valence state. The lower limit of the concentration of the starting metal-containing compound will depend upon several factors including the particular polymer used, the concentration of polymer in the water to be gelled, the water which is used, and the type of gel product desired. For similar reasons, the upper limit on the concentration of the starting metal-containing compound also cannot always be precisely defined. As a general guide, the amount of the starting polyvalent metal-containing compound used in preparing aqueous gels in accordance with the invention will be in the range of from 0.05 to 30, preferably 0.5 to 30, weight percent of the amount of the total polymer used. Those skilled in the art can determine the amount of starting polyvalent metal-containing compound to be used by simple experiments carried out in the light of this disclosure. For example, when brines such as are commonly available in producing oil fields are used as the water in preparing gels in accordance with the invention, less of the starting polyvalent metal-containing compounds is required than when distilled water is used. Gelation rates are frequently faster when using brines. Such oil field brines commonly contain varying amounts of sodium chloride, calcium chloride, magnesium chloride, etc. Sodium chloride is usually present in the greatest concentration. The word "water" is used generically herein and in the claims, unless otherwise specified, to include such brines, fresh water, and other aqueous media which can be gelled in accordance with the invention.

The reducing agents which can be used herein include sulfur-containing compounds such as sodium sulfite, sodium hydrosulfite, sodium metabisulfite, potassium sulfite, sodium bisulfite, potassium metabisulfate, sodium sulfide, sodium thiosulfate, ferrous sulfate, thioacetamide, sodium thiourea and others, and nonsulfur-containing compounds such as hydroquinone, ferrous chloride, p-hydrazinobenzoic acid, hydrazine phosphite, hydrazine dichloride, and others. Some of the above reducing agents act more quickly than others. More particularly, rate of reduction depends on the reducing agent selected, pH, and temperature. For example, sodium thiosulfate usually reacts slowly in the absence of heat, e.g., requiring heating to about 50° C. The presently most preferred reducing agents are sodium thiosulfate or thiourea. An especially preferred reducing agent for use in the gelable compositions of the present invention is thiourea.

The amount of reducing agent to be used in the practice of the invention will be a sensible amount, i.e., a small but finite amount which is more than incidental impurities, but which is effective or sufficient to reduce at least a portion of the higher valence metal in the starting polyvalent metal-containing compound to a lower valence state. Thus, the amount of reducing agent to be used depends, to some extent at least, upon the amount of the starting polyvalent metal-containing compound which is used. In many instances, it will be preferred to use an excess of reducing agent to compensate for dissolved oxygen in the water, exposure to air during preparation of the gels, and possible contact with other oxidizing substances such as might be encountered in field operations. As a general guide, the amount of reducing agent used will generally be at least 150, preferably at least about 200, percent of the stoichiometric amount required to reduce the metal in the starting polyvalent to said lower valence state, e.g., +6 Cr to +3 Cr. Those skilled in the art can determine the amount of reducing agent to be used by simple experiments carried out in the light of this disclosure.

The use of redox couples provides additional flexibility in handling, and positioning of the gelable composition so that rigid gel formation can be effected in the desired locations, e.g. the high permeability zones, of the oil-bearing formation. This is primarily because the time between mixing and the onset of gelation is generally proportional to the redox potential of the redox couple selected. Therefore, by carefully selecting the oxidizing agent and reducing agent comprising the redox couple, the user can regulate the time involved prior to gel formation, such that it can be placed at any pre-determined location by regulation of the fluid flow rate of the carrier of delivery fluids.

The gelable compositions of the present invention may be employed as profile modification agents in accordance with a number of contemplated methods. For example, either the polyvalent metal compound or the reducing agent, if used, can be first added to a solution of the polymer in water or other aqueous medium, or the metal containing compound and the reducing agent can be added simultaneously to a solution or an aqueous medium containing the polymers. Generally speaking, where convenient, the preferred method is to first disperse the polymer in the water or other aqueous medium. The reducing agent is then added to the dispersion with stirring. The metal-containing compound is then added to the solution or aqueous medium containing the polymer and the reducing agent, with stirring. The newly formed lower valence metal ions, for example, +3 chromium obtained from +6 chromium, effect rapid crosslinking of the polymers and gelation of the solution or aqueous medium containing same.

One presently preferred method of preparing the aqueous gels is to prepare the gel while the components thereof are being pumped into the well. This method comprises preparing a base solution of the polymer, adding to this base solution (a) a polyvalent metal compound such as sodium dichromate or (b) a reducing agent such as sodium thiosulfate or thiourea pumping the base solution down the well, and during pumping adding to said base solution the other of the reagents (a) and (b) which was not previously added thereto. It is also within the scope of the invention to incorporate all the components of the aqueous gel into a stream of water while it is being pumped, e.g., into a well. For example, the polymer can be added first to the flowing stream of water and the other components added subsequently in any suitable order. Turbulent flow conditions in the pipe will provide proper mixing.

It is also within the scope of the invention to prepare a dry mixture of the polymer, the metal-containing compound, and the reducing agent, in proper proportions, and then add this dry mixture to the proper amount of water.

An advantage of the invention is that ordinary ambient temperatures and other conditions can be used in practically all instances in preparing the aqueous gels of the invention or aqueous medium containing same.

Aqueous gels in accordance with the invention can be prepared having a wide range of viscosities or firmnesses ranging from low viscosity or highly mobile gels having a relatively low viscosity up to firm or rigid gels which are nonmobile. The choice of gel viscosity or concentration will depend upon the use to be made of the gel. The actual viscosity and/or gel strength of the gel will depend upon the type and concentration of polymer, the type and amount of starting polyvalent metal compound used and the type and amount of reducing agent used.

As stated above, the gelable compositions and gels produced therewith are particularly useful as profile modification agents in enhanced oil recovery operations in high temperature and/or harsh environment reservoirs. The gelable compositions of this invention are useful for decreasing the permeability of selected portions of underground formations prior to or during secondary or tertiary recovery operations and also for water shut off treatments in producing wells. For example, in an enhanced oil recovery operation, a conventional waterflood or gas drive is performed in the conventional manner until the drive fluid breaks through into the production well in excessive amounts. The gelable compositions of the present invention are then pumped down the injection well and into the formation in any suitable manner and in any suitable amount, and for any desired length of time sufficient to obtain the desired in-depth penetration, gel formation and consequent permeability reduction in the high permeability zones of the formation. Usually, an in-depth penetration of from 10 to 1,000, preferably 25 to 900, feet from the injection well will be sufficient. However, this can vary from formation to formation, and penetrations outside said ranges can be used. For example, there can be injected into the formation via the injection well from about 0.001 to about 0.5 pore volumes of gelable composition in accordance with the invention, or by injecting a slug of about 200 to 5,000 barrels of gelable composition into the well and then into the formation. Injection in one of the above manners will provide a flood front adjacent the oil to be produced. If desired, an ordinary brine or water can then be employed to drive the gelable composition to the desired location of the formation. If desired, in order to avoid any sharp demarcations in viscosity or mobility of the gel, which could adversely affect the relative mobility of the flood medium and the oil and cause channeling, the viscosity or concentration of the gel can gradually be lessened through a series of incremental decreases rather than discontinuing the injection thereof abruptly.

In another embodiment of the invention, the formation can be treated prior to carrying out the fluid drive secondary recovery operations. This embodiment is particularly applicable where there is good knowledge of the nature of the formation. Thus, in a formation where the oil-bearing strata are interspersed with more permeable porous strata which contain no oil or an insufficient amount of oil to make secondary recovery operations economical, but which more permeable strata would still act as a thief zone, the formations can be treated in accordance with the invention prior to initiating the fluid drive operation.

In still another embodiment, the invention can be applied to producing wells, either oil wells or gas wells, where there is a more porous nonhydrocarbon-bearing strata adjacent the hydrocarbon-bearing strata. For example, such a condition can exist where there is water sand adjacent the hydrocarbon-bearing strata and the water intrudes into the borehole and interferes with the production of hydrocarbons. In such instances, the formation can be treated in accordance with the invention to shut off the flow of water. The method of carrying out such a water shutoff treatment is substantially the same as described above in connection with fluid drive operations.

It is also within the scope of the invention to carry out the gel injection techniques of the invention periodically or intermittently, as needed, during the course of a fluid drive secondary operation, or during the production of oil from a producing well.

In all of the above operations, the injection of the gels of the invention can be carried out in any conventional manner. If desired, a gel of suitable viscosity or concentration can be injected as the drive fluid per se. Gels injected in accordance with the invention can be prepared in advance, stored in suitable tanks, and then pumped into the well; or said gels can be formed in a conduit leading to the injection well, or in the tubing in the well itself, and then injected into the formation. Thus, the required amounts of the mixture of polymer, polyvalent metal compound, and reducing agent can be metered into the tubing in the well, mixed therein, and then injected into the formation. If desired, selected portions of the formation can be isolated mechanically, as by the use of packers, and other means known to the art, for treatment in accordance with the invention.

The gelable compositions are particularly useful as profile modification agents for high temperature reservoirs and are capable of forming stable gels having useful gel lives of more than six months at reservoir temperatures of up to about 120° C., more preferably up to from about 120°-150° C., and even up to about 200° C. Moreover, the crosslinked gels of the present invention are stable for prolonged periods in harsh environment reservoirs and the gels generally do not shrink, decompose or exhibit syneresis after prolonged exposure to concentrated brines. Generally, a harsh environment reservoir may be defined as a reservoir having a temperature above about 60° C. and formation water or brine having a concentration of divalent salts of calcium and magnesium of about about 100 ppm. Under harsh environment conditions prior art gel compositions based on polyacrylamides are not satisfactory.

The following working Examples are provided by way of illustration only to enable those skilled in this art to better understand and practice the present invention.

DETAILED DESCRIPTION OF THE PREFERRED EMBODIMENTS

In each of the following examples, several polymers are tested as the polymeric component (b) of the gelable compositions and each of the resulting gels were evaluated for high temperature stability performance at various elevated temperatures. For comparison, a prior art gelable composition comprising copolymers of acrylamide and sodium acrylate as the polymeric component (b) is also evaluated.

In each of the following examples, the polymeric materials are prepared in accordance with a well known conventional method which may be summarized in terms of preferred reagents, as follows:

In a reaction vessel, equipped with nitrogen purge, heating element and mechanical stirrer, is added a mixture of sodium 2-acrylamido-2-methylpropanesulfonic acid and/or sodium acrylate in addition to N,N¹-dimethylacrylamide in deionized water and containing the sodium salt of diethylenetriaminepentaacetate and sodium hypophosphate. The solution is sparged with nitrogen at 25° C. for 30 minutes and then 2,2¹-azobisamidinopropane hydrochloride, ammonium persulfate and ferrous ammonium sulfate are added an catalyst. After 140 minutes, the reaction is essentially complete and the temperature is 49° C. After post-treatment to react the last traces of monomer (2 hours at 70° C.) the product is allowed to cool to R.T. A typical terpolymer as a 0.5% solution in N sodium chloride has a Brookfield Viscosity (60 rpm/25° C.) of 3.7 m Pa.s.

In each of the following examples the polyvalent metal crosslinking agents are provided in the form of a redox couple wherein the oxidizing agent employed is sodium dichromate and the reducing agent employed is selected from sodium thiosulfate or thiourea.

The gelable compositions are prepared and tested in a standard harsh environment brine containing 5.0% NaCl and 0.5% $CaCl_2$ as the water component (A), to more closely simulate actual reservoir conditions. The gelable compositions are prepared by dissolving the polymeric component in harsh brine to provide a solution having the polymer concentration indicated. The dichromate oxidizing agent, as a 10% aqueous solution, is added and well blended. Thereafter, the reducing agent selected is added and mixed well. The reducing agents are also added in the form of a 10% aqueous solution.

A variety of samples are tested for high temperature gel stability in harsh brine by placing aliquot portions of gelable compositions into sealed glass ampoules, which are placed in a controlled temperature oven and checked periodically for retained gel characteristics. Performance of the compositions tested is evaluated by visual inspection of the gels after each period by tipping the glass ampoules on their sides. An acceptable gel performance is characterized by a general retention of the original gel properties, i.e., macroscopic gel stiffness. In the following examples, a pass grade is given to gel samples, which when tipped: (a) retained their shape against the bottom and sidewalls of the ampoule with the top surface of the gel remaining verticle at 90° to the sidewall and the top surface is either rigid or springy; (b) generally retain the shape of the container but exhibit moderate shrinkage with or without exuding water; and (c) generally retain the shape of the container but exhibit a moderate amount of viscoelasticity such that the top surface of the gel flows slightly to form a 45° angle to the sidewall. A failing grade is assigned to those gels tested which are characterized by the formation of partially or completely fluid phases upon aging. Generally, two kinds of catastrophic gel failure are noted in the examples. In the first type of gel failure, when the ampoule is tipped on its side, the gelled network has completely broken down to a free flowing liquid state. The liquified gel flows as the ampoule is tipped such that the top surface of the gel becomes parallel to the sidewall.

The second kind of catastrophic gel failure noted in the examples is syneresis wherein the gelled network collapses in on itself and is characterized by the formation of a fluid slurry of discrete gel particles in water.

EXAMPLES 1-12

In the following Examples a number of gelable compositions are prepared and tested for high temperature gel stability at both 90° C. and 120° C. The compositions are prepared by thoroughly admixing the ingredients in the proportions specified. All compositions are prepared in a standard harsh environment brine containing 5.0% NaCl and 0.5% $CaCl_2$ as the water component. For comparison, the compositions of the present invention are tested against identical compositions except that a 90/10 acrylamide/sodium acrylate copolymer, a homopolymer of sodium 2-acrylamido-2-methylpropanesulfonate, a homopolymer of sodium acrylate and a homopolymer of $N,N^1$-dimethylacrylamide are employed as polymer component (b). In Tables I and II:

AM=acrylamide
DMA=$N,N^1$-dimethylacrylamide
NaAc=sodium acrylate
NaMPS=sodium 2-acrylamido-2-methylpropane sulfonic acid
Chrome=sodium dichromate
TS=sodium thiosulfate
TU=thiourea
Chrome ratio=$Cr^{3+}$:—$CO_2Na$ g.atom.mol$^{-1}$
y=yes
n=no

TABLE I

| Example | DMA mol % | NaAc mol % | NaMPS mol % | Temp °C. | Chrome ppm | TS ppm | gel y/n |
|---|---|---|---|---|---|---|---|
| A. Copolymers |
| A | — | — | 100 | 90 | 4000 | 12,000 | n |
| B | 100 | — | — | 90 | 4000 | 12,000 | n |
| C | — | 100 | — | 90 | 4000 | 12,000 | n |
| 1 | 95 | 5 | — | 90 | 4000 | 12,000 | y |
| 2 | 90 | 10 | — | 90 | 4000 | 12,000 | y |
| 3 | 80 | 20 | — | 90 | 4000 | 12,000 | y |
| 4 | 70 | 30 | — | 90 | 4000 | 12,000 | y |
| 5 | 60 | 40 | — | 90 | 4000 | 12,000 | y |
| 6 | 50 | 50 | — | 90 | 4000 | 12,000 | y |
| 7 | 10 | 90 | — | 120 | 13500 | 40,500(TU) | y |
| B. Terpolymers |
| 8 | 10 | 10 | 80 | 90 | 4000 | 12,000 | y |
| 9 | 10 | 30 | 60 | 90 | 4000 | 12,000 | y |
| 10 | 50 | 10 | 40 | 90 | 4000 | 12,000 | y |
| 11 | 30 | 30 | 40 | 90 | 4000 | 12,000 | y |
| 12 | 70 | 10 | 20 | 90 | 4000 | 12,000 | y |
| 13 | 50 | 30 | 20 | 90 | 4000 | 12,000 | y |

TABLE II

| | Polymer | | | | Thermal Stability at 120°C. in 5% NaCl +0.5% $CaCl_2$ | | | |
|---|---|---|---|---|---|---|---|---|
| Example | DMA Mol % | NaAc Mol % | NaMPS Mol % | AM Mol % | Chrome ppm | Chrome Ratio | TS ppm | Stability Days |
| D | — | 10 | — | 90 | 1000 | 0.15 | 3,000 | 26 |
| 14 | 70 | 30 | — | — | 4000 | 0.27 | 12,000 | >192 |
| 15 | 50 | 50 | — | — | 4000 | 0.16 | 12,000 | >192 |
| 16 | 50 | 10 | 40 | — | 4000 | 1.20 | 12,000 | 109 |

The results of Tables I and II demonstrate the improved high temperature stability of gelable compositions within the scope of the present invention as compared with compositions employed in the prior art. More particularly, the homopolymers shown in Examples A, B and C did not form a gel at any stage demonstrating the necessity of a chelatable group to be present within the polymer chain. The compositions of the present invention, shown in Examples 1–13 all formed gels, that of Example 7 doing so at 120° C., and Examples 14–16 demonstrate good high temperature stability at 120° C. The copolymer of Example D however, lost its stability after 26 days.

EXAMPLES 17 AND 18

Following the procedures of Examples 1 and 10 except that aluminum citrate 2:1 mole ratio, is used as the cross-linking agent, similar results are achieved.

It should be understood that the foregoing Examples have been provided to illustrate the kinds of preliminary tests that may be performed to determine the effectiveness of various compositions for use as profile modification agents in a given reservoir setting, presenting certain conditions of temperature, salinity, pH and oxygen content.

EXAMPLE 19 AND 20

The following example demonstrates profile modification of a simulated subterranean formation in the form of a sandpacked column or "core".

Aliquot portions of the compositions of Examples 4 and 10 are placed in glass ampoules.

A six-inch sand-packed column is prepared and flushed with seawater until completely wetted. The initial permeability of the column is $K_{br}=45$ Darcy.

The gelable composition is slowly introduced to the column to saturate the sand-pack, and addition continued until at least 50 mls of gelable composition have been collected from the bottom of the column.

Thereafter, both the saturated column and the ampoule samples are placed in an oven at 113° C. (235° F.). The aliquot sample gels in about 3½ to 4 hours. Both the column and samples are heat-aged at this temperature for 37 days.

After 37 days, the ampoule sample is still a rigid gel.

The aged treated sand-pack is then subjected to a pressurized pipe test, by forcing synthetic seawater against the sand-pack with a Milton Roy mini pump. The face pressure of the gelled column increases to 500 psi before a breakthrough is observed.

The foregoing example demonstrates the effectiveness of the compositions of the present invention in reducing the permeability, i.e., altering the fluid flow profile, of an underground formation characterized by elevated reservoir temperatures above 100° C.

The new and improved compositions and methods of the present invention now permit effective profile modification of subterranean hydrocarbon-bearing formations to be performed in high temperature and/or harsh brine reservoirs which heretofore were unsuited for treatments in accordance with prior art methods employing prior art materials.

Although the present invention has been described with reference to certain preferred embodiments, modifications or changes may be made therein by those skilled in this art. For example, as has been mentioned above, instead of N,N-dimethylacrylamide, N,N¹-diethylacrylamide or N,N-di-t-butylacrylamide may be used in the polymer component (b). Instead of $Cr^{3+}$ being used as the oxidizing or crosslinking agent other polyvalent metal ions or ion containing compounds may be used such as $Fe^{2+}$, $Fe^{3+}$, $Ti^{4+}$, $Zn^{2+}$, $Sn^{4+}$, $Mg^{2+}$, $Ce^{4+}$, potassium permangamate, sodium permangamate, ammonium chromate, alkali metal chromates, ammonium or potassium dichromate, chromium trioxide, to name but a few. Instead of sodium thiosulfate and thiourea being used as the reducing agent, other reducing agents such as sodium sulfide, sodium hydrosulfite, sodium metabisulfite, potassium sulfite, sodium sulfite, ferrous sulfate, ferrous chloride, or complexing agents such as acetate, nitrilotriacetate, tartrate, citrate, tripolyphosphate, metaphosphate, orthophosphate and the like may be used. All such obvious modifications may be made herein, without departing from the scope and spirit of the present invention as defined in the appended claims.

What is claimed is:

1. A gellable composition comprising:
   (a) water,
   (b) a water thickening and crosslinkable amount of a water-dispersible polymer consisting essentially of:
      (i) from about 5 to about 75 mol percent of N,N¹-dimethylacrylamide, and
      (ii) from about 5 to about 35 mol percent of acrylic acid units or salts thereof, and
      (iii) from about 10 to about 90 mol percent of 2-acrylamido-2-methylpropanesulfonic acid units or salts thereof, and
   (c) an amount of a trivalent chromium or aluminum compound or a redox couple of a hexavalent chromium compound and a reducing agent chromium compound capable of cross-linking said polymer to form a stable gel.

2. A profile modification agent for altering the fluid flow profile of a subterranean formation having reservoir temperatures up to about 200° C. comprising:
   (a) water,
   (b) from about 0.5 to about 5.0%, by weight, based upon the weight of the overall composition, of a water-dispersible polymer consisting essentially of,
      (i) from about 5 to about 75 mol percent of N,N¹-dimethylacrylamide, and
      (ii) from about 5 to about 35 mol percent of acrylic acid units or salts thereof, and
      (iii) from about 10 to about 90 mol percent of 2-acrylamido-2-methylpropanesulfonic acid units or salts thereof, and acid units or salts thereof, and
   (c) an amount of a trivalent chromium or aluminum compound or a hexavalent chromium compound sufficient to crosslink said polymer to form a high temperature stable gel.

3. A two component composition for use as a profile modification agent in high temperature and/or harsh brine containing subterranean oil-bearing reservoirs, comprising:
   (I) a first component comprising:
      A. a water—dispersible polymer consisting essentially of:
         (i) from about 5 to about 75 mol percent of units of N,N¹-dimethylacrylamide, and
         (ii) from about 5 to about 35 mol percent of acrylic acid units or salts thereof; and
         (iii) from about 10 to about 90 mol percent of 2-acrylamido-2-methylpropanesulfonic acid units or salts thereof, and
      B. an oxidizing agent selected from the group consisting of ammonium dichromate and alkali metal dichromates, or
      C. a reducing agent selected from the group consisting of sodium thiosulfate and thiourea, and II. a second component comprising the other of (B) or (C) which is not present in Component I.

4. A profile modification agent as recited in claim 1, wherein polymer component (b) has a molecular weight of from about 100,000 to about 15,000,000.

5. A profile modification agent as recited in claim 2 wherein polymer component (b) has a molecular weight of from about 100,000 to about 15,000,000.

6. A gellable composition as recited i claim 1, wherein said hexavalent chromium compound is provided in the form of a redox couple, said chromium being capable of being reduced to a trivalent state and in a form normally available for reaction until contacted with a reducing agent, with a reducing agent effective to reduce the hexavalent chromium to a trivalent state.

7. A profile modification agent as recited in claim 2, wherein said hexavalent chromium compound is provided in the form of a redox couple, said chromium being capable of being reduced to a trivalent state and in a form normally available for reaction until contacted with a reducing agent, with a reducing agent effective to reduce the hexavalent chromium to a trivalent state.

8. A gellable composition as recited in claim 6, wherein said reducing agent is selected from the group consisting of: alkali metal sulfites, alkali metal hydrosulfites, alkali metal metabisulfites, alkali metal sulfides, alkali metal thiosulfates, ferrous sulfate, thioacetamide, thiourea, hydroquinone, ferrous chloride, P-hydrazinobenzoic acid, hydrazine phosphite and hydrazine dichloride.

9. A profile modification agent as recited in claim 7, wherein said reducing agent is selected from the group consisting of: alkali metal sulfites, alkali metal hydrosulfites, alkali metal metabisulfites, alkali metal sulfides, alkali metal thiosulfates, ferrous sulfate, thioacetamide, thiourea, hydroquinone, ferrous chloride, p-hydrazinobenzoic acid, hydrazine phosphite and hydrazine dichloride.

10. A profile modification agent as recited in claim 7, wherein said redox couple comprises (i) sodium dichromate and (ii) sodium thiosulfate or thiourea.

11. A profile modification agent as recited in claim 1, wherein the water comprises an aqueous reservoir brine.

12. A profile modification agent as recited in claim 2, wherein the water comprises an aqueous reservoir brine.

13. A profile modification agent as recited in claim 1, wherein said chromium compound is added in an amount sufficient to provide a m.eq. $Cr^{3+}$/m.mol $COO^-$ ratio of from about 0.25 to about 0.36.

14. A profile modification agent as recited in claim 2, wherein said chromium compound is added in an amount sufficient to provide a m.eq. $Cr^{3+}$/m.mol $COO^-$ ratio of from about 0.25 to about 0.36.

* * * * *